United States Patent [19]
Nakano

[11] Patent Number: 5,893,815
[45] Date of Patent: Apr. 13, 1999

[54] CONTINUOUSLY VARIABLE TOROIDAL TRANSMISSIONS

[75] Inventor: Masaki Nakano, Yokohama, Japan

[73] Assignee: Nissan Motor Co., Ltd., Yokohama, Japan

[21] Appl. No.: 08/857,862

[22] Filed: May 16, 1997

[30] Foreign Application Priority Data

May 27, 1996 [JP] Japan .................... 8-131660

[51] Int. Cl.$^6$ ............................. F16H 15/38
[52] U.S. Cl. ............................ 476/42; 476/40
[58] Field of Search ......................... 476/40, 42

[56] References Cited

U.S. PATENT DOCUMENTS 5,067,360  11/1991  Nakano ........................... 476/42

FOREIGN PATENT DOCUMENTS 61-124764  6/1986  Japan .
4-29659    1/1992  Japan .

*Primary Examiner*—Allan D. Herrman
*Attorney, Agent, or Firm*—Foley & Lardner

[57] ABSTRACT

A continuously variable toroidal transmission includes an upper link swingably connected to roller support members, and a link post mounted to a casing and having an opening formed along an axis of a main shaft. Support pins are disposed between the upper link and the link post, each having one end mounted to the upper link and another end swingably inserted in the opening of the link post.

9 Claims, 6 Drawing Sheets

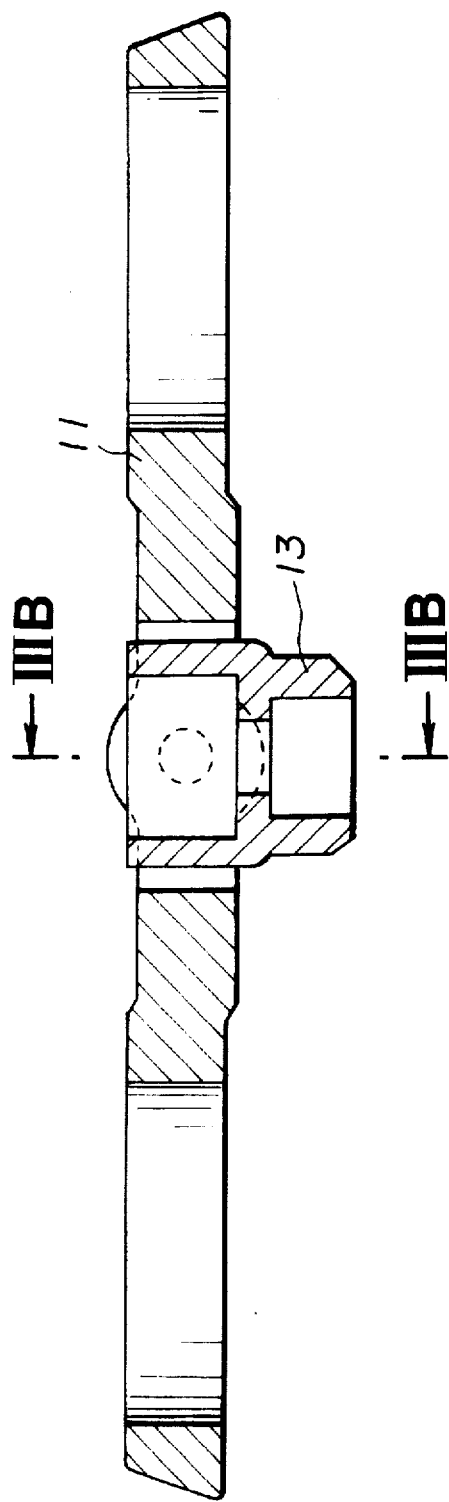
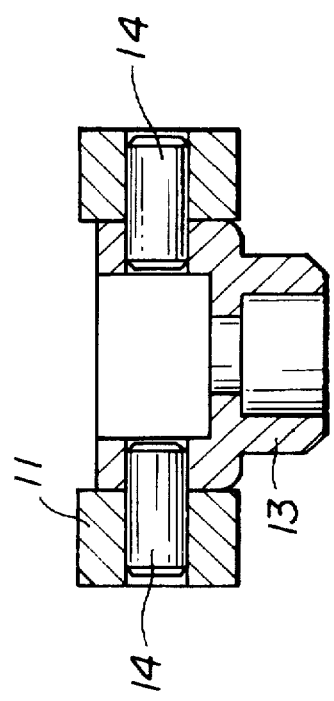

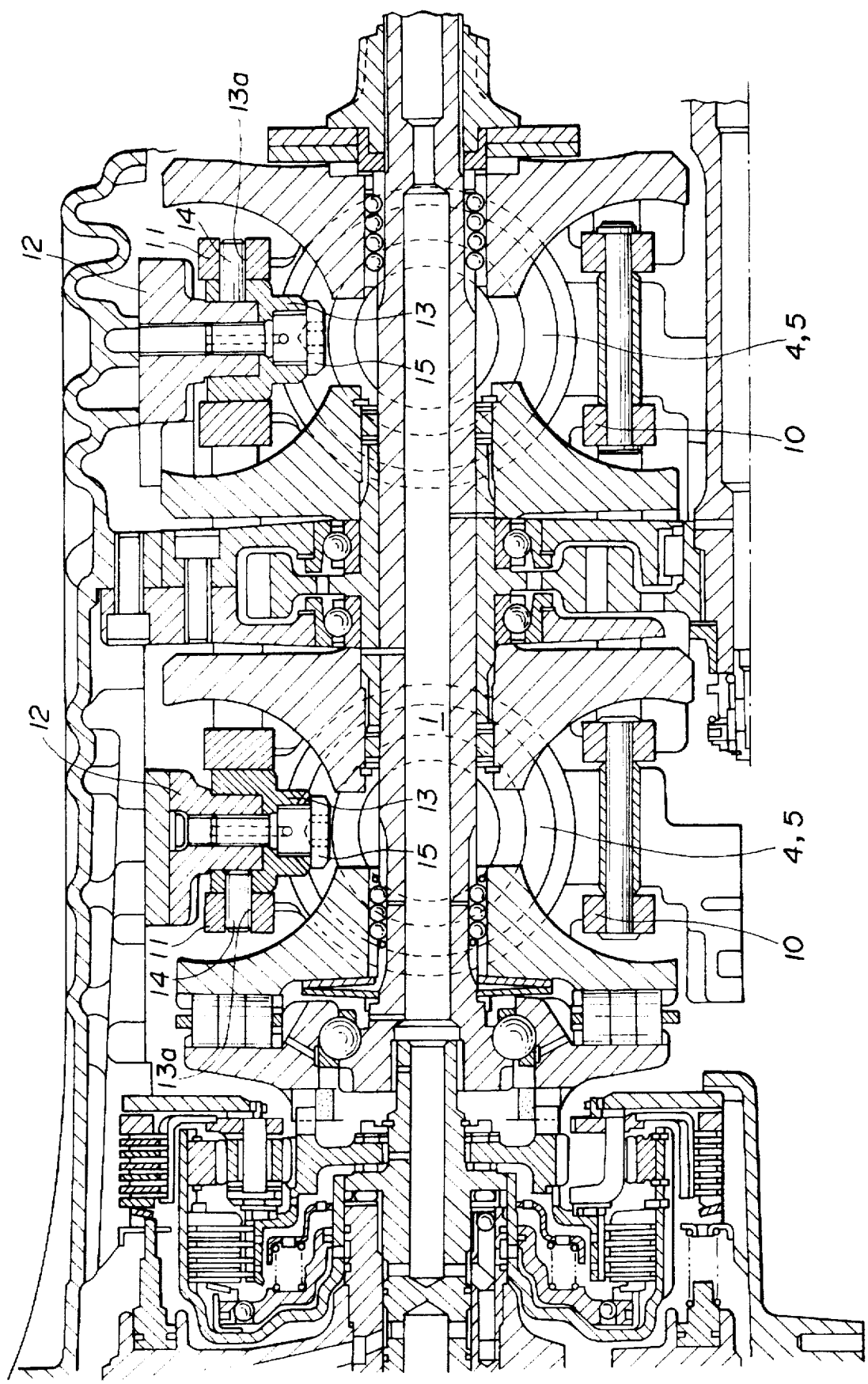

CONTINUOUSLY VARIABLE TOROIDAL TRANSMISSIONS

BACKGROUND OF THE INVENTION

The present invention relates generally to continuously variable toroidal transmissions and more particularly to an improvement in the structure of component parts thereof.

Generally, with conventional continuously variable toroidal transmissions, a center portion of an upper link is swingably mounted to a link post through a spherical bearing as disclosed, e.g. in JP-A 4-29659. However, in view of an oscillation center of the upper link located at the spherical bearing, the lengths of right and left portions thereof are not equal to, but different from each other since every point in the diameter of the spherical bearing can be a supporting point, having a bad influence on the shift performance.

In this connection, JP-A 61-124764 proposes the structure for supporting an upper link and an link post by a support pin, which allows an equal movement of right and left portions of the upper link upon shifting, resulting in possible maintaining of the desired shift performance.

Upon assembling of the transmissions, components parts are generally brought into a casing through an opening formed on the side of a lower link, i.e. a lower portion of the transmission. Thus, the solution proposed by JP-A 61-124764 makes assembling of the transmissions practically difficult, resulting in impossible application to real manufacturing of the transmissions.

It is, therefore, an object of the present invention to provide continuously variable toroidal transmissions which can be assembled easily without causing the above inconvenience.

SUMMARY OF THE INVENTION

According to one aspect of the present invention, there is provided a continuously variable transmission, comprising:

a casing;

a main shaft disposed in said casing;

input and output disks disposed on said main shaft;

power rollers interposed between said input and output disks for ensuring power transmission through frictional engagement therewith;

support members arranged to rotatably support said power rollers;

a link swingably connected to said support members;

a link post mounted to said casing, said link post having an opening formed along an axis of said main shaft; and pins disposed between said link and said link post.

Another aspect of the present invention lies in providing a continuously variable transmission, comprising:

a casing;

a main shaft disposed in said casing;

input and output disks disposed on said main shaft;

power rollers interposed between said input and output disks for ensuring power transmission through frictional engagement therewith;

support members arranged to rotatably support said power rollers;

a link swingably connected to said support members;

a link post mounted to said casing, said link post having an opening formed along an axis of said main shaft; and means for connecting said link and said link post.

BRIEF DESCRIPTION OF THE DRAWINGS

FIG. 3A is an enlarged sectional view showing an upper link and a link post;

FIG. 3B is a view similar to FIG. 3A, taken along the line IIIB—IIIB in FIG. 3A;

FIG. 6 is a view similar to FIG. 5, showing a fourth embodiment of the present invention.

DETAILED DESCRIPTION OF THE INVENTION

Figure 1:
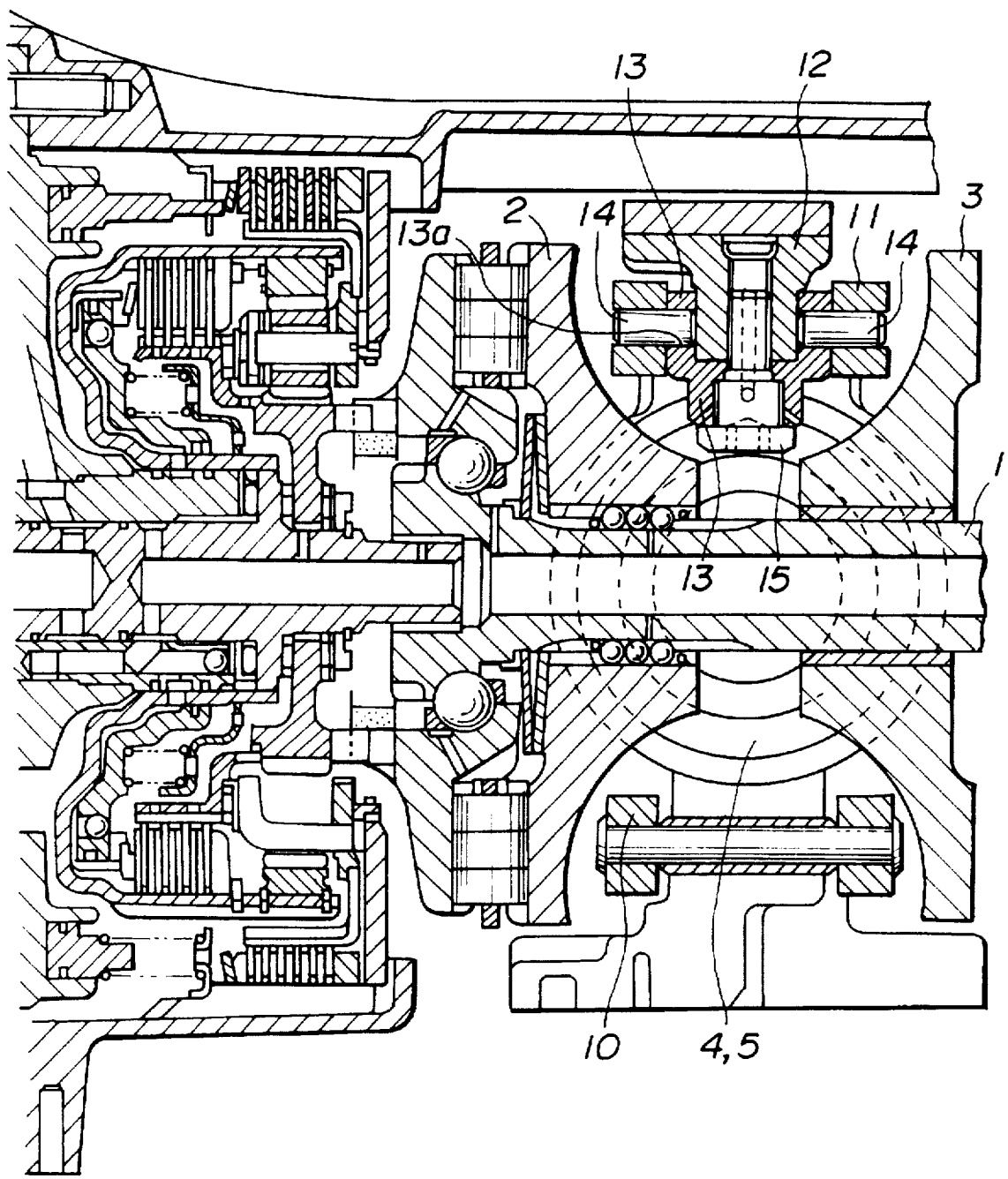
FIG. 1 is a longitudinal section showing a first embodiment of a continuously variable toroidal transmission according to the present invention.

Referring to the drawings wherein like reference numerals designate like parts throughout the views, preferred embodiments of continuously variable toroidal transmissions according to the present invention will be described.

Figure 2:
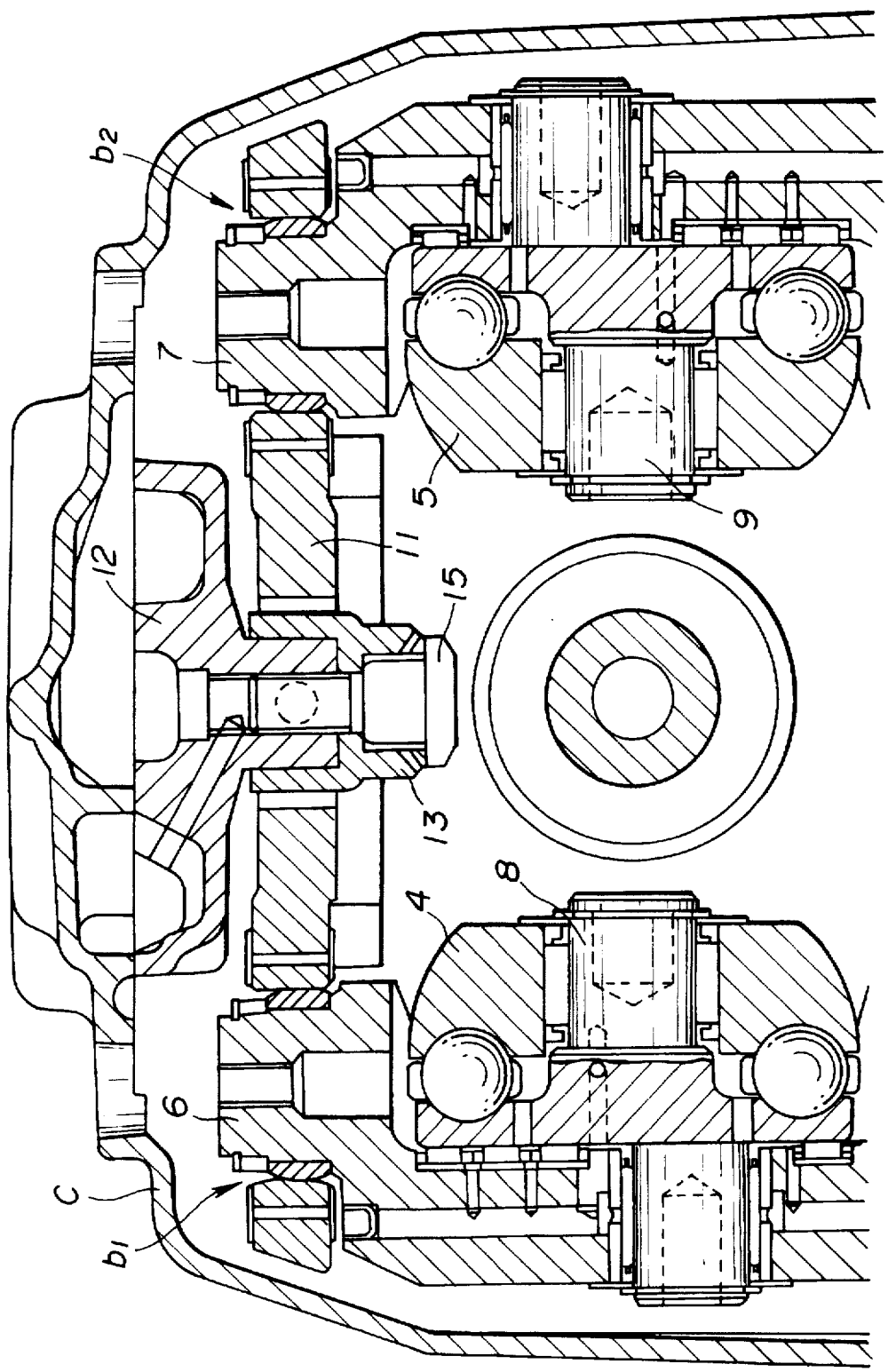
FIG. 2 is a cross section showing the continuously variable toroidal transmission.

FIGS. 1–3B show a first embodiment of the present invention. Referring to FIGS. 1–2, a continuously variable toroidal transmission comprises a main shaft 1, input and output disks 2, 3 disposed on the main shaft 1, power rollers 4, 5 interposed between the input and output disks 2, 3 for ensuring power transmission through frictional engagement therewith, and roller support members 6, 7 for rotatably supporting the power rollers 4, 5 through eccentric shafts 8, 9. The roller support members 6, 7 are connected to a piston rod, not shown, to be rotatable about the axis thereof.

A lower link 10 is swingably connected to a link post, not shown, arranged to a piston head. An upper link 11 has both ends swingably connected to upper ends of the roller support members 6, 7 through spherical bearings $b_1, b_2$. A post base 12 is arranged to a casing C in the upper portion thereof. A link post 13 is mounted to the post base 12 by a bolt 15, and has an opening 13a parallel the axis of the main shaft 1.

Referring also to FIGS. 3A–3B, support pins 14 are arranged to the upper link 11 in the center portion thereof. In the first embodiment, each support pin 14 has one end press fitted in the upper link 11, and another end swingably inserted in an opening 13a of the link post 13.

According to the first embodiment, the upper link 11 and the link post 13 are connected to each other by the support pins 14 each having one end press fitted in the upper link 11 and another end swingably inserted in the opening 13a of the link post 13. Thus, the only work to do after inserting the link post 13 with the upper link 11 previously mounted thereto in the casing C is to mount the link post 13 to the post base 12 by the bolt 15 as an engagement member, resulting in easier assembling than that of the conventional transmissions.

Figure 4:
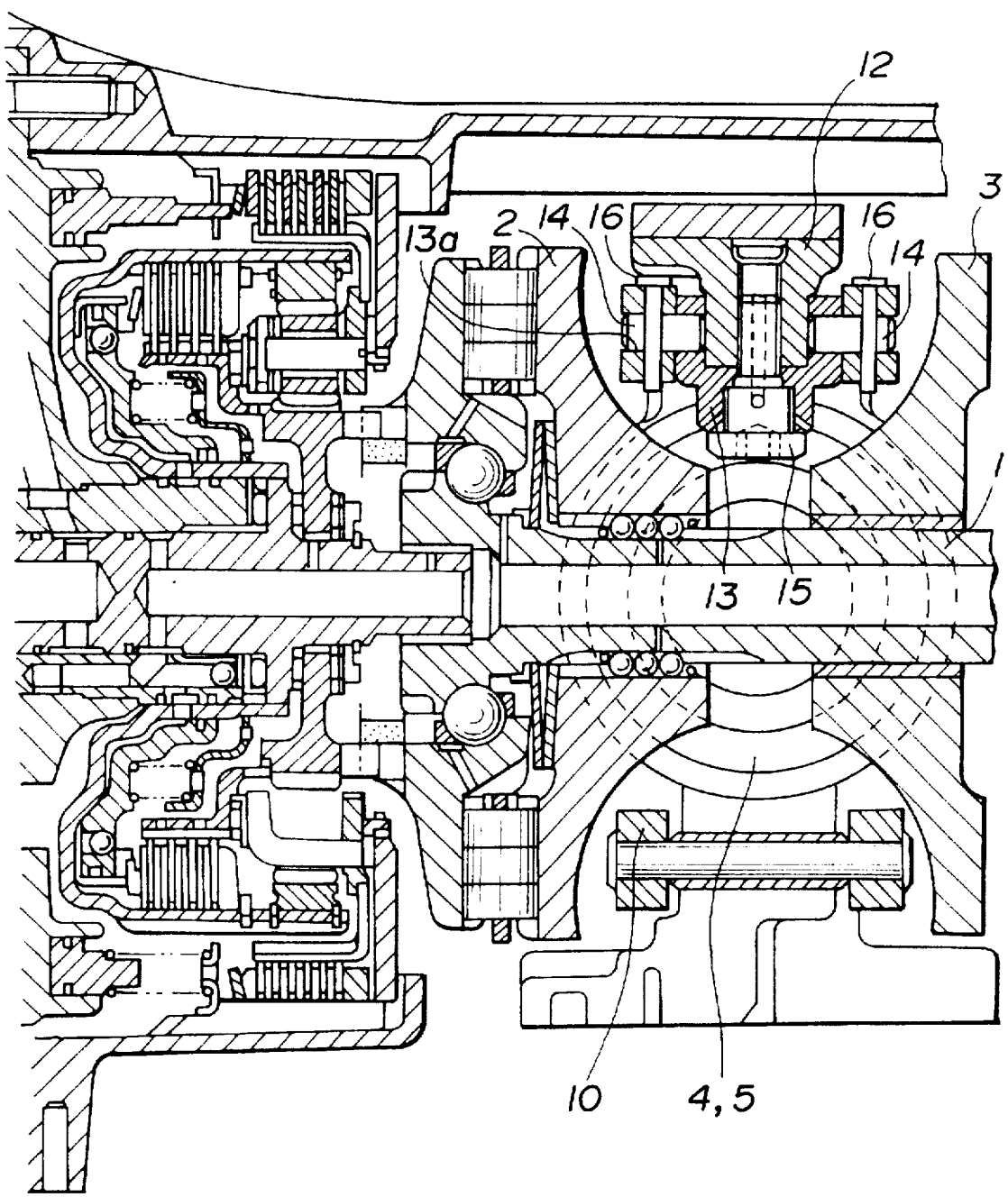
FIG. 4 is a view similar to FIG. 1, showing a second embodiment of the present invention.

FIG. 4 shows a second embodiment of the present invention wherein the support pin 14 is mounted to the upper link 11 not through press fit, but by anti-loose pins 16 each arranged through the upper link 11 and the support pin 14. The second embodiment allows relatively easy assembling in the same way as the first embodiment.

Figure 5:
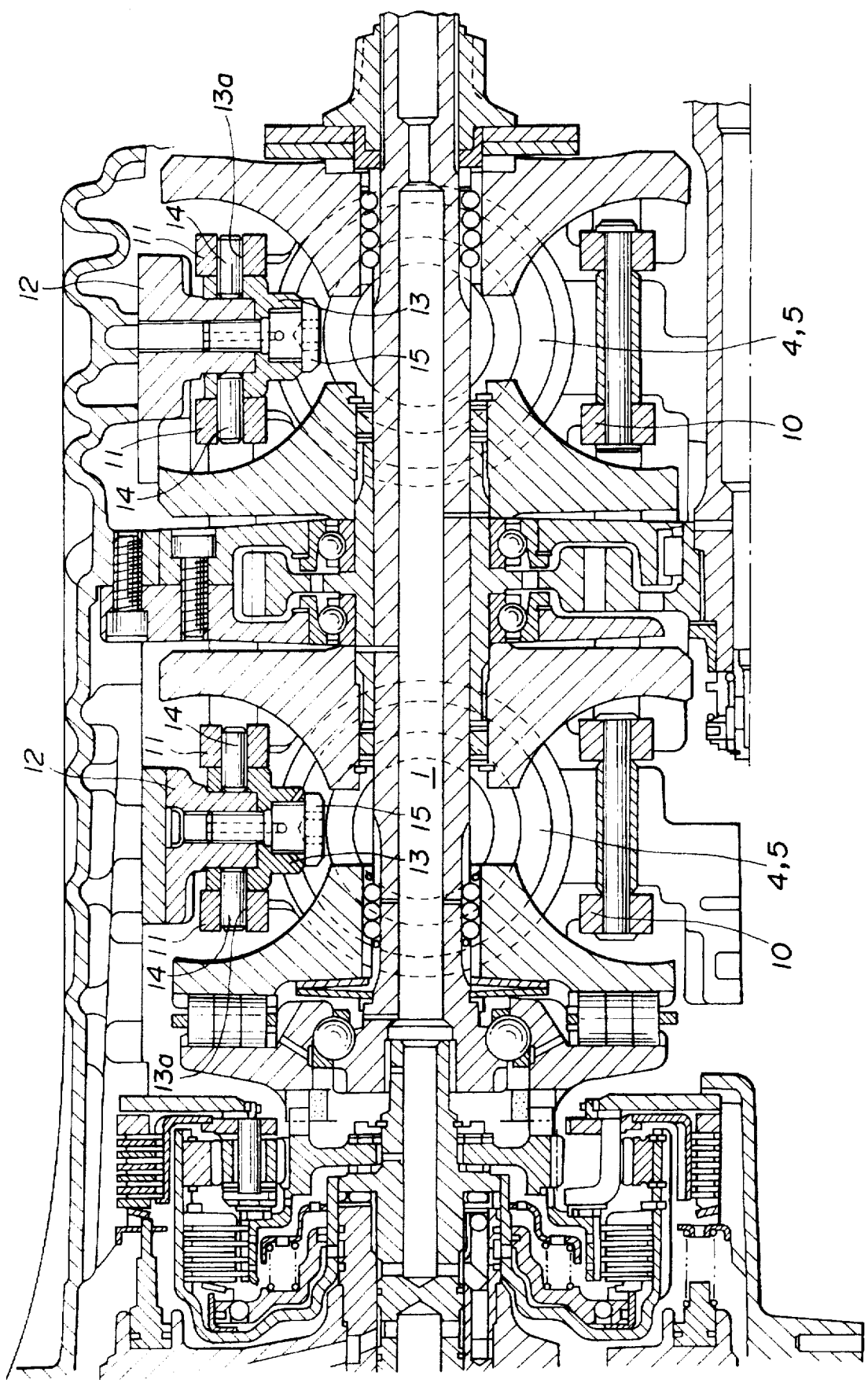
FIG. 5 is a view similar to FIG. 4, showing a third embodiment of the present invention.

FIG. 5 is a third embodiment of the present invention wherein the present invention is applied to continuously variable double-cavity transmissions. Since the transmission of this type comprises front and rear links 11 integrated with each other, two support pins 14 may be oppositely disposed along the axis of the main shaft 1, and held by the front and rear link posts 13 as shown in FIG. 6, resulting in an advantage of possible sure supporting with the number of the support pins 14 reduced.

Having described the present invention in connection with the preferred embodiments, it is noted that the present invention is not limited thereto, and various changes and modifications can be made without departing from the scope of the present invention. By way of example, the support pin 14 may be integrated with the upper link 11 in place of being mounted to the upper link 11 through press fit or by the anti-loose pins 16.

What is claimed is:

1. A continuously variable transmission, comprising:

a casing;

a main shaft disposed in said casing;

input and output disks disposed on said main shaft;

power rollers interposed between said input and output disks for transmitting power through frictional engagement with said input and output disks;

support members rotatably supporting said power rollers;

a link swingably connected to said support members;

a link post mounted on said casing, said link post having an opening parallel to an axis of said main shaft; and pins disposed in the opening for providing a swivel joint between said link and said link post.

2. A continuously variable transmission as claimed in claim 1, wherein each of said pins has one end mounted on one of said link and said link post, and another end swingably inserted in an other of said link and said link post.

3. A continuously variable transmission as claimed in claim 2, wherein said pins include two pins disposed facing each other.

4. A continuously variable transmission as claimed in claim 2, wherein said pins are mounted on said link by press fitting.

5. A continuously variable transmission as claimed in claim 2, wherein said pins are mounted on said link by anti-loose pins.

6. A continuously variable transmission as claimed in claim 2, wherein said pins are integral with said link.

7. A continuously variable transmission, comprising:

a casing;

a main shaft disposed in said casing;

a first pair of input and output disks disposed on said main shaft;

a second pair of input and output disks disposed on said main shaft in tandem with said first pair of input and output disks;

a plurality of power rollers, each of said plurality of power rollers being interposed between an associated pair of input and output disks for transmitting power through friction engagement from its respective input disk to its respective output disk;

first and second support members, each of said first and second support members rotatably supporting associated ones of said plurality of power rollers;

first and second links, each of said first and second links being swingably connected to a respective one of said first and second support members;

first and second link posts, each of said first and second link posts being mounted on said casing and having an opening parallel to an axis of said main shaft; and first and second pins, each of said first and second pins being disposed in a respective opening of said first and second link posts for providing a swivel joint between each respective link and link post.

8. A continuously variable transmission as claimed in claim 7, wherein said first and second links are integral with each other.

9. A continuously variable transmission as claimed in claim 7, wherein said first and second pins are oppositely disposed with respect to one another.

* * * * *